US006971659B2

(12) United States Patent
Uemoto et al.

(10) Patent No.: US 6,971,659 B2
(45) Date of Patent: Dec. 6, 2005

(54) MOTORCYCLE FUEL TANK

(75) Inventors: Takumi Uemoto, Kobe (JP); Keishi Fukumoto, Akashi (JP)

(73) Assignee: Kawasaki Jukogyo Kabushiki Kaisha, Hyogo (JP)

( * ) Notice: Subject to any disclaimer, the term of this patent is extended or adjusted under 35 U.S.C. 154(b) by 0 days.

(21) Appl. No.: 10/900,808

(22) Filed: Jul. 28, 2004

(65) Prior Publication Data
US 2005/0023817 A1 Feb. 3, 2005

(30) Foreign Application Priority Data
Aug. 1, 2003 (JP) ............................. 2003-284892

(51) Int. Cl.[7] .............................................. B62J 35/00
(52) U.S. Cl. .................... 280/304.4; 280/290; 280/835
(58) Field of Search ............................ 280/835, 830, 280/304.4, 290; 180/219, 225

(56) References Cited

U.S. PATENT DOCUMENTS

| 575,787 | A | * | 1/1897 | Voitek ..................... 280/304.1 |
| 4,311,261 | A | * | 1/1982 | Anderson et al. ........... 224/418 |
| 4,978,167 | A | * | 12/1990 | Harvey ................... 297/215.13 |
| 5,409,287 | A | * | 4/1995 | Suzuki .................... 296/180.1 |
| D371,537 | S | * | 7/1996 | Jennings .................... D12/409 |
| 6,131,935 | A | * | 10/2000 | Judkins ....................... 280/290 |
| 6,588,789 | B1 | * | 7/2003 | Porcella ...................... 280/290 |
| 2002/0020573 | A1 | * | 2/2002 | Fournier et al. ............ 180/182 |

FOREIGN PATENT DOCUMENTS

| DE | 3125460 | * | 1/1983 | ............. B62J 9/00 |
| JP | 62-29478 | | 2/1987 | |
| JP | 2-95996 | * | 4/1990 | ............. B62J 35/00 |

* cited by examiner

*Primary Examiner*—Avraham Lerner

(57) ABSTRACT

To provide a fuel tank capable of permitting the motorcycle rider to hang deep over the top of the fuel tank and also allowing the motorcycle rider to fix his or her position with respect to a direction laterally of the fuel tank, the fuel tank (14) has a groove-like recess (14a) defined in a portion of the top surface thereof generally intermediate of the width of the fuel tank (14), so that when the motorcycle rider (R) takes a forward tilting position, his or her head (r1) and chest (r2) can be received therein.

15 Claims, 3 Drawing Sheets

MOTORCYCLE FUEL TANK

BACKGROUND OF THE INVENTION

1. Field of the Invention

The present invention generally relates to a fuel tank for motorcycles and, more particularly, to the motorcycle fuel tank of a design capable of permitting a rider to hang deep over a top of the fuel tank to thereby take a deep forward tilting position.

2. Description of the Prior Art

It is well known that during traveling, specifically, in a circuit course, some motorcycle riders prefer to steer the motorcycle while taking a forward tilting position relative to the motorcycle to minimize an air drag on the rider body. In such case, as is discussed in the Japanese Laid-open Patent Publication No. 62-29478, when the motorcycle rider takes a forward tilting position, his head and chest are brought substantially in contact with a top surface of the fuel tank that is mounted on an upper region of the motorcycle frame structure and between a handlebar and a seat.

However, considering that the top surface of the fuel tank, is generally convened to protrude upwardly, it is not easy for the rider to take a deep forward tilting position nor to fix his or her position with respect to a direction transverse to the longitudinal sense of the motorcycle, since the rider's head and chest are brought into contact with the convened top surface of the fuel tank.

SUMMARY OF THE INVENTION

In view of the foregoing, the present invention is intended to provide a fuel tank for motorcycles of a design capable of permitting the motorcycle rider to easily hang deep over the top of the fuel tank and also allowing the motorcycle rider to fix his or her position with respect to a direction transverse to the longitudinal sense of the motorcycle.

In order to accomplish the foregoing object, the present invention provides a fuel tank having a top surface formed with a longitudinal recess disposed at a location generally intermediate of the width of the fuel tank. The longitudinal recess referred to above has a size so chosen as to receive therein the head and chest of a motorcycle rider to when the motorcycle rider takes a forward tilting position.

According to the present invention, when the motorcycle rider takes a forward tilting position with his or her hands gripping the handlebar, a front portion of the rider's head and a rider's chest portion can find their way into the recess quite naturally and, accordingly, the upper half of the rider's body can be lowered by a quantity corresponding to the depth of the recess to allow the rider to assume a deep forward tilting position. At the same time, with the rider's chest portion buried in the recess, the position of the upper half of the rider's body with respect to a direction transverse to the longitudinal sense of the motorcycle (or in a direction of forward travel) can also be fixed.

It is to be noted that the rider's head referred to above and hereinafter is to be understood as represented by an upper portion of the rider's body above the neck, including his or her face and crash helmet worn by the rider.

In a preferred embodiment of the present invention, the recess referred to above is narrower than an outer width of the fuel tank and is formed in a groove shape extending in a direction longitudinally of the fuel tank, to thereby allow the top surface of the fuel tank to provide a natural smooth shape.

Preferably, the recess has a ratio of a maximum depth to a maximum width (max. depth/max. width), which is within the range of 1/40 to 1/15 and more preferably within the range of 1/30 to 1/20. Selection of such ratio between the maximum depth and the maximum width is effective to provide the recess in the top surface of the fuel tank, which is neither too deep nor too shallow.

The fuel tank and the recess preferably have opposite side edge portions which, when viewed from top, represent respective outwardly bulged shapes. This design is effective to allow the fuel tank and the recess to be balanced in shape.

In a preferred embodiment, the width of the recess at any arbitrarily chosen point on the fuel tank is within the range of 50 to 80% of an outer width of the fuel tank at such point, so that the width of the recess can have a value large enough to allow the rider's head and chest to be smoothly buried in the recess.

The recess preferably exhibits the maximum depth at a location where it exhibits the maximum width, to thereby allow the recess to represent a smooth shape.

In a further preferred embodiment, that portion of the recess, which exhibits the maximum width lies at a location spaced from a front end of the fuel tank a distance of about ⅓ of the length as measured from the front end to a rear end of the fuel tank. This is particularly advantageous in that the portion of the recess ranging from a front portion to the intermediate portion of the fuel tank can be deeper than the remaining portion thereof and, therefore, the rider can easily take the deep forward tilting position with his head and chest buried deep in the recess.

BRIEF DESCRIPTION OF THE DRAWINGS

In any event, the present invention will become more clearly understood from the following description of a preferred embodiment thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DETAILED DESCRIPTION OF THE EMBODIMENT

Figure 1:
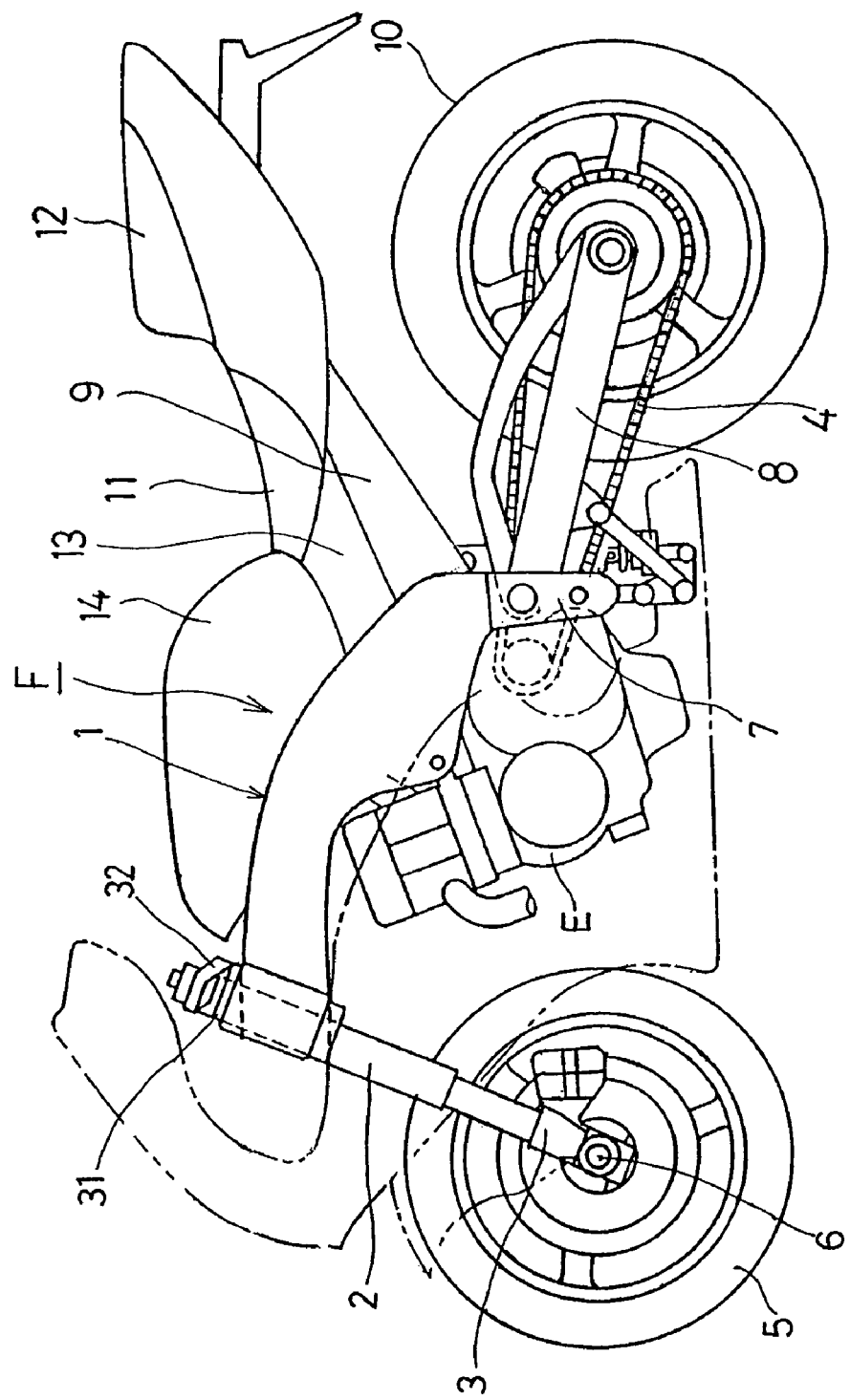
FIG. 1 is a schematic side view showing a motorcycle equipped with a fuel tank according to a preferred embodiment of the present invention.

Reference will now be made to the accompanying drawings for the detailed description of the present invention. Referring first to FIG. 1 showing in a schematic side view a motorcycle equipped with a fuel tank designed in accordance with the present invention. As shown therein, the motorcycle includes a motorcycle frame structure F which includes a main frame 1 forming a front region of the motorcycle frame structure F, a front fork 2 mounted on a front end portion of the main frame 1 by means of an upper bracket 31, a front wheel 5 rotatably mounted on a front axle 6 that is supported by bottom casings 3 carried by a lower region of the front fork 2, and a handlebar 32 mounted on the upper bracket 31 so as to extend generally transversely of the axis of swing of the front fork 2.

The main frame 1 has a pair of left and right rear lower end portions and a pair of swing arm bracket 7 are fixedly secured to respective rear lower end portions of the main frame 1. A swing arm 8 including left and right legs is swingably connected to the swing arm bracket 7, with a rear wheel rotatably supported by and between the swing arm legs. An internal combustion engine E is fixedly supported on a lower intermediate portion of the main frame 1 and has its drive output end drivingly connected with the rear wheel 10 by means of an endless drive chain 4.

A seat rail 9 is connected with and extends rearwardly from a rear end portion of the main frame 1 and a dual seat assembly including a front rider's seat 11 and a rear passenger's seat 12 is mounted on the seat rail 9. A fuel tank 14 of a configuration having a top surface smoothly curved to protrude upwardly is supported in an upper region of the main frame 1, i.e., an upper portion of the motorcycle frame structure F at a location between the handlebar 32 and the rider's seat 11.

Figure 2:
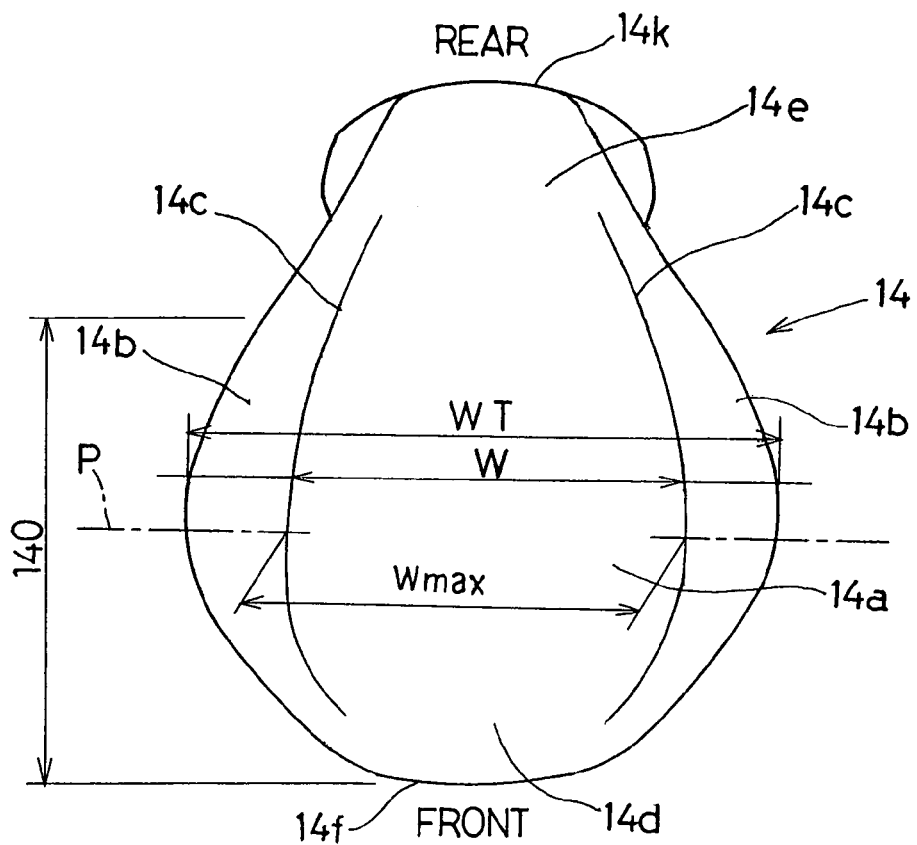
FIG. 2 is a top plan view, on an enlarged scale, of the fuel tank.
Figure 3:
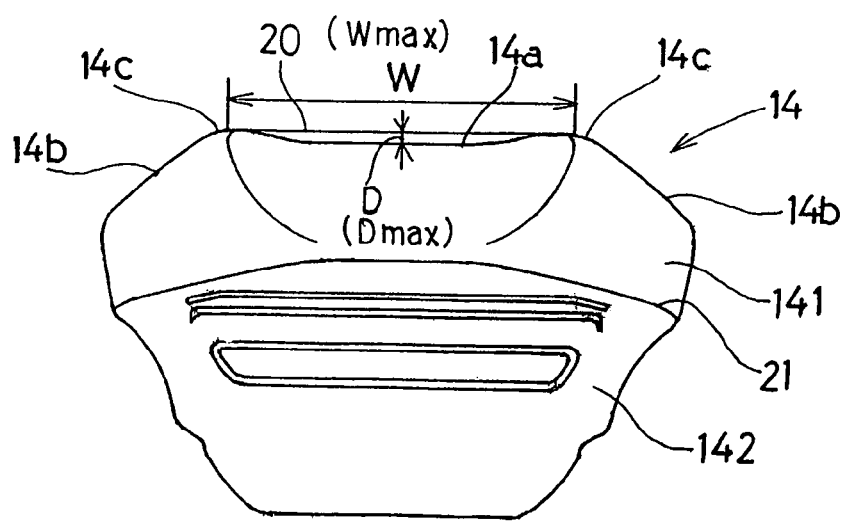
FIG. 3 is a front elevational view of the fuel tank.

As best shown in FIGS. 2 and 3, the upwardly curved top surface of the fuel tank 14 has a portion generally intermediate of the width thereof as measured in a direction perpendicular to the longitudinal sense of the motorcycle frame structure F or to the direction of forward travel, which portion is formed with a generally groove-like recess 14a of a relatively large width extending from a front portion 14d and a rear portion 14e of the fuel tank 14. This groove-like recess 14a is separated from left and right lateral ridge portions 14b of the top surface of the fuel tank 14 by means of smoothly raised convex portions 14c positioned on respective sides of the recess 14a.

The fuel tank 14 when viewed from top has side edge portions bulged outwardly in respective directions away from each other and, in correspondence with this configuration, opposite side edge portions of the recess 14a, that is, the convex portions 14c represent a outwardly bulged configuration. Specifically, the recess 14a has a maximum width Wmax and a maximum depth Dmax as shown in FIG. 3, the ratio of the maximum depth Dmax relative to the maximum width Wmax being so chosen as to be within the range of 1/40 to 1/15 and preferably within the range of 1/30 to 1/20, although in the illustrated embodiment and particularly as shown in FIG. 3, such ratio is chosen to be 1.5/40, i.e., 1/26.

The width of the recess 14a is defined as a distance between the opposite smoothly raised convex portions 14c and 14c whereas the depth of the recess 14a is defined as a distance between the deepest bottom of the recess 14a and the line drawn to pass in contact with respective tops of the smoothly raised convex portions 14c. The width of the recess 14a at any arbitrarily chosen point is within the range of 50 to 80%, preferably 60 to 75%, of the outer width WT of the fuel tank 14 at such arbitrarily chosen point.

That portion of the recess 14a, which exhibits the maximum width Wmax lies at a location P spaced from the front end 14f of the fuel tank 14 a distance of about ⅓ of the length as measured from the front end 14f to the rear end 14r of the fuel tank 14. The maximum depth Dmax of the recess 14a occurs also at such location P.

Figure 4:
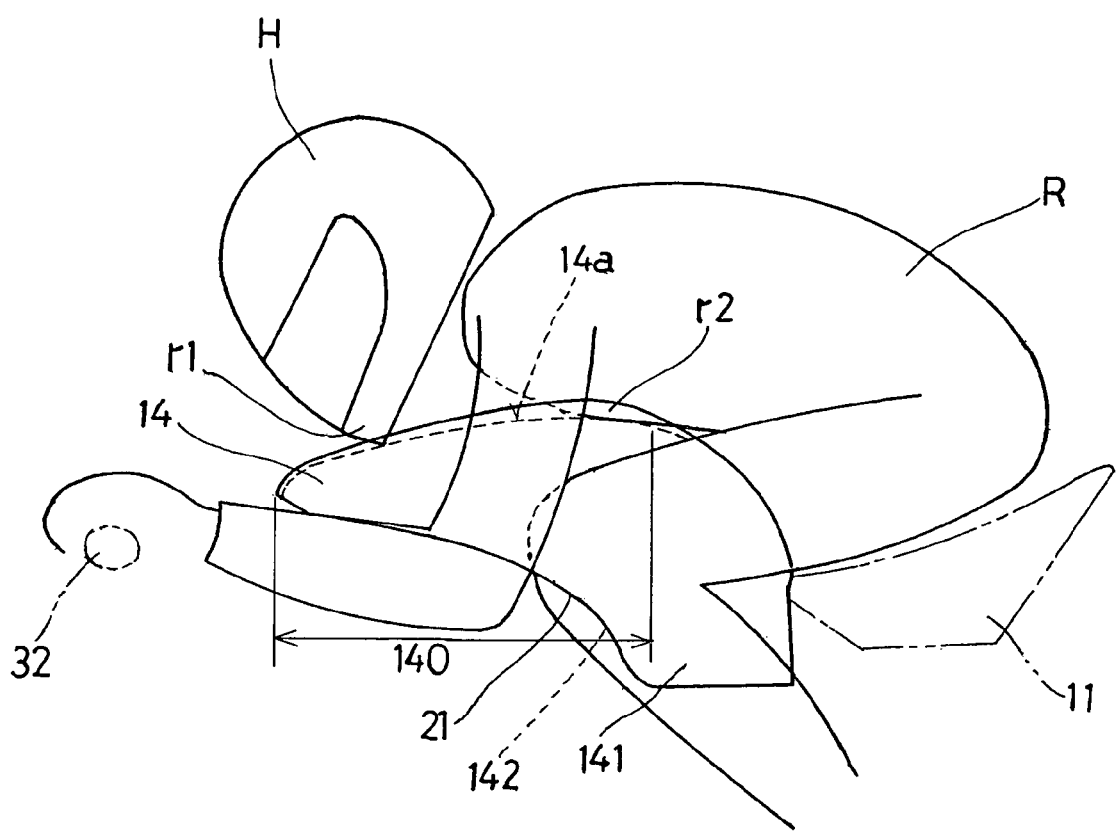
FIG. 4 is a schematic diagram showing the motorcycle rider taking a forward tilting position.

The fuel tank 14 is a press molded product of two-piece construction made of a metallic material, with upper and lower tank components 141 and 142 welded together along a line of joint 21 as shown in FIG. 3. As best shown in FIG. 4, the upper tank component 141 defines top, left and right side, front and rear surfaces of the fuel tank 14 while the lower tank component 142 defines the bottom of the fuel tank 14. The groove-like recess 14a referred to above is formed in the top surface during the press molding of the upper tank component 141.

With the fuel tank 14 so constructed as hereinabove described in accordance with the present invention, when the motorcycle rider R takes a forward tilting position, as shown in FIG. 4, with his or her hands gripping the handlebar 32, a front portion r1 of the rider's head (specifically, a front portion of a crash helmet H) and a rider's chest portion r2 can find their way into the groove-like recess 14a quite naturally. Accordingly, the upper half of the rider's body can be lowered by a quantity corresponding to the depth of the recess 14a to allow the rider to assume a deep forward tilting position with the upper half of the rider's body buried in the recess 14a. At the same time, with the rider's chest portion r2 buried in the recess, the position of the upper half of the rider's body with respect to a direction transverse to the longitudinal sense of the motorcycle frame structure can also be fixed.

Considering that as hereinbefore described the recess 14a is so shaped as to represent a groove extending in a direction conforming to the longitudinal sense of the motorcycle, the recess 14a provides a sensation of an aesthetically streamlined feature, allowing the top surface of the fuel tank 14 to provide a natural smooth shape. Also, since the fuel tank 14 and the recess 14a each have their side edge portions which, when viewed from top, represent an outwardly bulged configuration, the fuel tank 14 and the recess 14 can provide an aesthetically well-balanced sensation.

Selection of the ratio of the maximum depth Dmax relative to the maximum width Wmax of the recess 14a within the range of 1/40 to 1/15 provides the groove of neither too deep nor too shallow and is effective to allow the rider to easily take a deep forward tilting position and also to fix his position with respect to the direction laterally of the fuel tank 14. If the ratio is smaller than 1/40, it means that the recess 14a is too shallow, the rider R will find difficulty taking the deep forward tilting position and, also, fixing his position with respect to the direction laterally of the fuel tank 14. On the other hand, if the ratio exceeds 1/15, it means that the recess 14a is too deep, the capacity of the fuel tank 14 will naturally be limited.

In addition, selection of the relatively large width of the recess 14a, that is, selection of the width of the recess 14a within the range of 50 to 80% of the outer width WT of the fuel tank 14, is effective to allow the head and chest of the rider R to be easily buried in the recess 14a.

Also, since the recess 14a has the maximum depth Dmax at the position thereof where the maximum width Wmax is exhibited, the recess 14a can provide a smooth shape. Preferably, that portion of the recess 14a, which exhibits the maximum width Wmax lies at the location P spaced from the front end 14f of the fuel tank 14 a distance of about ⅓ of the length as measured from the front end 14f to the rear end 14r of the fuel tank 14. By so doing, a portion of the recess 14a ranging from the front portion thereof to the intermediate portion can be deeper than the remaining portion thereof and, therefore, the rider R can easily take the deep forward tilting position with the front portion r1 of his or her head and the chest r2 thereof buried deep in the recess 14a.

Although the present invention has been filly described in connection with the preferred embodiments thereof with reference to the accompanying drawings which are used only for the purpose of illustration, those skilled in the art will readily conceive numerous changes and modifications within the framework of obviousness upon the reading of the specification herein presented of the present invention. Accordingly, such changes and modifications are, unless they depart from the scope of the present invention as delivered from the claims annexed hereto, to be construed as included therein.

What is claimed is:

1. A fuel tank for a motorcycle including a motorcycle frame structure, a handlebar and a seat, which fuel tank is mounted on a top region of the motorcycle frame structure and between the handlebar and the seat, comprising
a top surface formed with a longitudinal recess disposed at a location generally intermediate of the width of the fuel tank, said longitudinal recess having a size so chosen as to allow a portion of a head and a chest portion of a motorcycle rider to be supported therein when the motorcycle rider takes a forward tilting position.

2. The fuel tank as claimed in claim 1, wherein the recess is narrower than an outer width of the fuel tank and is formed in a groove shape extending in a direction longitudinally of the fuel tank.

3. The fuel tank as claimed in claim 2, wherein the recess has a ratio of a maximum depth to a maximum width, which is within the range of 1/40 to 1/15.

4. The fuel tank as claimed in claim 3, wherein the ratio is within the range of 1/30 to 1/20.

5. The fuel tank as claimed in claim 2, wherein the fuel tank and the recess have opposite side edge portions which, when viewed from top, represent respective outwardly bulged shapes.

6. The fuel tank as claimed in claim 3, wherein the width of the recess at any arbitrarily chosen point on the fuel tank is within the range of 50 to 80% of an outer width of the fuel tank at such point.

7. The fuel tank as claimed in claim 3, wherein the recess exhibits the maximum depth at a location where it exhibits the maximum width.

8. The fuel tank as claimed in claim 7, wherein that portion of the recess, which exhibits the maximum width, lies at a location spaced from a front end of the fuel tank a distance of about ⅓ of the length as measured from the front end to a rear end of the fuel tank.

9. In a motorcycle having a frame structure, a handlebar, seat, motor and wheels, the improvement of a fuel tank for reducing air drag of a rider comprising;
fuel tank body for holding fuel having an exterior surface with a longitudinal concave recess of a configuration to accommodate and support a substantial portion of a rider's chest to enable the front surface of the chest to be in contact with the fuel tank in the concave recess in a forward tilting riding position to reduce an air drag.

10. The motorcycle of claim 9 wherein the fuel tank has an approximately oval top plan perimeter with edges of the concave recess being a pair of symmetrically facing concave edges spaced inward from the respective sides of the oval in a longitudinal direction.

11. The motorcycle of claim 10 wherein the concave recess has a central surface that is progressively inclined downward from a position adjacent an upper front surface of the fuel tank to a position adjacent an upper rear surface of the fuel tank.

12. The motorcycle of claim 11 wherein the sides of the oval, outward of the concave facing edges, slant downward.

13. The motorcycle of claim 11, wherein the concave recess has a ratio of a maximum depth to a maximum width, which is within the range of 1/40 to 1/15.

14. The motorcycle of claim 13, wherein the ratio is within the range of 1/30 to 1/20.

15. The motorcycle of claim 13, wherein the width of the concave recess at any arbitrarily chosen point on the fuel tank is within a range of 50 to 80% of an outer width of the fuel tank at such point.

* * * * *